US011644527B2

(12) United States Patent
O'Shea et al.

(10) Patent No.: US 11,644,527 B2
(45) Date of Patent: May 9, 2023

(54) LOST-IN-FOREST GPS-DENIED POSITIONING SYSTEM (71) Applicant: The Charles Stark Draper Laboratory, Inc., Cambridge, MA (US)

(72) Inventors: Patrick O'Shea, Munster, IN (US); William W. Whitacre, Boston, MA (US); Christopher C. Yu, Belmont, MA (US); Juha-Pekka J. Laine, Boston, MA (US); Charles A. McPherson, North Reading, MA (US)

(73) Assignee: The Charles Stark Draper Laboratories, Inc., Cambridge, MA (US)

(*) Notice: Subject to any disclaimer, the term of this patent is extended or adjusted under 35 U.S.C. 154(b) by 487 days.

(21) Appl. No.: 16/291,351

(22) Filed: Mar. 4, 2019

(65) Prior Publication Data
US 2019/0368877 A1 Dec. 5, 2019

Related U.S. Application Data (60) Provisional application No. 62/678,764, filed on May 31, 2018.

(51) Int. Cl.
G01S 5/16 (2006.01)
G01C 21/04 (2006.01)
(Continued)

(52) U.S. Cl.
CPC .............. G01S 5/16 (2013.01); G01C 21/04 (2013.01); G01C 21/16 (2013.01); G01S 13/89 (2013.01); G01S 17/89 (2013.01); G06V 20/10 (2022.01)

(58) Field of Classification Search
CPC . G01S 5/16; G01S 13/89; G01S 17/89; G01S 7/4808; G01C 21/04; G01C 21/16; G01C 21/005; G06K 9/00664
See application file for complete search history.

(56) References Cited

U.S. PATENT DOCUMENTS

2006/0146053 A1* 7/2006 Gatewood, Jr. ......... G06T 17/05
345/440
2012/0314935 A1* 12/2012 Cheng .................... G06V 20/20
382/154

(Continued)

OTHER PUBLICATIONS

Cieslewski, Titus; Dymczyk, Marcin; Lynen, Simon; Siegwart, Roland; Map API—Scalable decentralized map building for robots, 2015, IEEE, pp. 2-3 (Year: 2015).*

(Continued)

Primary Examiner — Aniss Chad
Assistant Examiner — Chase L Cooley
(74) Attorney, Agent, or Firm — Brooks Kushman, P.C.

(57) ABSTRACT

Local terrain feature location data is obtained from a local sensor device at a user location without a prior-known global position. The local terrain feature location data characterizes relative distances and directions to a plurality of local terrain features nearest to the user location. Global terrain feature location data stored in at least one hardware memory device is accessed. The global terrain feature location data characterizes relative distances and directions between a plurality of distinctive terrain features located in a defined terrain region in terms of absolute global location coordinates. The local terrain feature location data is compared to the global terrain feature location data to develop multiple pattern matching hypotheses, wherein each pattern matching hypothesis characterizes a likelihood of a subset of the local terrain features matching a subset the global terrain features.

(Continued)

Global location coordinates for the user location is then determined from the pattern matching hypotheses.

15 Claims, 11 Drawing Sheets (51) Int. Cl.

| | |
|---|---|
| G01C 21/16 | (2006.01) |
| G01S 13/89 | (2006.01) |
| G01S 17/89 | (2020.01) |
| G06V 20/10 | (2022.01) |

(56) References Cited

U.S. PATENT DOCUMENTS

2015/0228077 A1* 8/2015 Menashe .................. G06T 7/97
 382/103
2016/0259815 A1* 9/2016 Song ..................... G06K 9/6201

OTHER PUBLICATIONS

Go, S.M., "Cognitive map generation for localization and navigation from 3-D laser scan images", URL: http://etd.library.vanderbilt.edu/available/etd-03312005-132116/unrestricted/MSThesisETD.pdf; Mar. 31, 2003, pp. 3-34, Appendix B, pp. 67-73.

Ihemado, O.C. et al., "Invariant Information Local Sub-map Filter (IILSF) for efficient simultaneous localisation and mapping of large environments", 9th International Workshop on Robot Motion and Control, IEEE, Jul. 3, 2013, pp. 282-287.

Shoudong, Huang et al., "Mapping large scale environments using relative position information among landmarks", 2006 IEEE International Conference on Robotics and Automation (ICRA): Orlando, FL, May 15-19, 2006, IEEE Operations Center, Piscataway, NJ, May 15, 2006, pp. 2297-2302.

European Patent Office, International Search Report and Written Opinion for PCT/US2019/020505 dated Sep. 3, 2019, 15 pp.

* cited by examiner

| Global Tree Index | Local Tree Index |
|---:|---:|
| 1 | 2 |
| 299 | 1 |
| 538 | 3 |
| 601 | 3 |
| 515 | 4 |
| 600 | 4 |
| 559 | 5 |
| 563 | 5 |
| 569 | 5 |
| 573 | 5 |
| 579 | 5 |
| 592 | 5 |
| 593 | 5 |
| 605 | 5 |
| 606 | 5 |
| 637 | 5 |
| 659 | 5 |
| 660 | 5 |
| 661 | 5 |
| 669 | 5 |
| 685 | 5 |
| 542 | 6 |
| 615 | 6 |
| 638 | 6 |
| 708 | 7 |
| 824 | 7 |
| 828 | 7 |
| 708 | 8 |
| 717 | 8 |

*FIG. 11*

LOST-IN-FOREST GPS-DENIED POSITIONING SYSTEM

This application claims priority from U.S. Provisional Patent Application 62/678,764, filed May 31, 2018, which is incorporated herein by reference in its entirety.

TECHNICAL FIELD

The present invention relates to GPS-denied navigation and, more particularly, to navigation systems that use previously obtained landmark information, such as imagery of treetops, and a multiple hypothesis k-closest matching algorithm to automatically ascertain a location.

BACKGROUND ART

Navigation is necessary for human economic and social activity. Navigation can also be essential in situations or environments in which safety of the navigator is not secured. The challenge in navigating accurately to a destination or direction is compounded with navigation instruments that have errors and/or in areas without connection to a satellite when attempting to use a global positioning system (GPS). For example, a soldier or sailor may depend on navigation systems and techniques to get to safety and may be unable to do so in GPS-denied areas.

Terrain-aided navigation and landmark-based navigation typically require prior knowledge for mapping and positioning to be useful. Vision-aided navigation requires more complex data-processing requirements and introduces a much more difficult component in trying to image match an image taken from a horizontal perspective to an image taken from a vertical perspective. Because of this challenge, current vision-aided navigation research mainly focuses on local navigation and mapping rather than global geolocation. When using existing landmark positions and range finding equipment to geolocate and navigate, both general prior position knowledge and a clear view of landmarks in the area are needed, which may not be possible in a lost-in-a-forest setting.

SUMMARY

Embodiments of the present invention are directed to a computer-implemented method employing at least one hardware implemented navigation processor and a related computer program product for terrain feature matching navigation. The navigation processor is operated to execute program instructions to obtain local terrain feature location data from a local sensor device at a user location without a prior-known global position, the local terrain feature location data characterizing relative distances and directions to a plurality of local terrain features nearest to the user location. Global terrain feature location data stored in at least one hardware memory device is accessed, wherein the global terrain feature location data characterizes relative distances and directions between a plurality of distinctive terrain features located in a defined terrain region in terms of absolute global location coordinates. The local terrain feature location data is compared to the global terrain feature location data to develop multiple pattern matching hypotheses, wherein each pattern matching hypothesis characterizes a likelihood of a subset of the local terrain features matching a subset the global terrain features. Global location coordinates for the user location are determined from the pattern matching hypotheses.

In further specific embodiments, the global location coordinates for the user location are updated as the user location varies over time with user movement; for example, using time varying location movement data from an inertial measurement unit (IMU) device. The comparing may be based on a k-closest vector search algorithm and/or may include considering mapping uncertainty factors in terms of a defined pattern matching confidence threshold.

The local sensor device may specifically be a LiDar device, a laser range finding device or a camera. The global terrain feature location data may be derived from overhead imaging data, lidar data and/or radar data. And the distinctive terrain features may be trees.

DETAILED DESCRIPTION

Embodiments of the present invention are directed to approaches for precision GPS-denied positioning and navigation with little additional equipment and limited data processing requirements. The specific context discussed herein is a user who is lost in a forest without prior position information, though the ideas have applications in other settings that have multiple terrain features. For example, in urban environments, buildings, statues and/or other structures may serve as the "trees" referenced herein. Even greatly damaged buildings (for example, damaged as a result of an earthquake or war) may still have some standing walls, corners and edges that may be used so long as a distance and angle to such terrain features can be measured from a user's position. Measurements of distance may be inferred from sequences of angle measurements through user motion as typical in visual odometry or structure from motion (SFM) applications.

Embodiments of the present invention such as those described herein require little existing infrastructure and can be accomplished with minimal resources. There is also no requirement to have prior information of the observer location. The general concept revolves around the identification of distinctive terrain features such as trees in an observer's local area that can be matched to existing maps of global tree locations using a robust adaptation of star identification algorithms. The resulting matches provide the user with an accurate global position based on the existing map. This method can then be extended to incorporate inertial measurement unit (IMU) data as a navigation tool.

Figure 1:
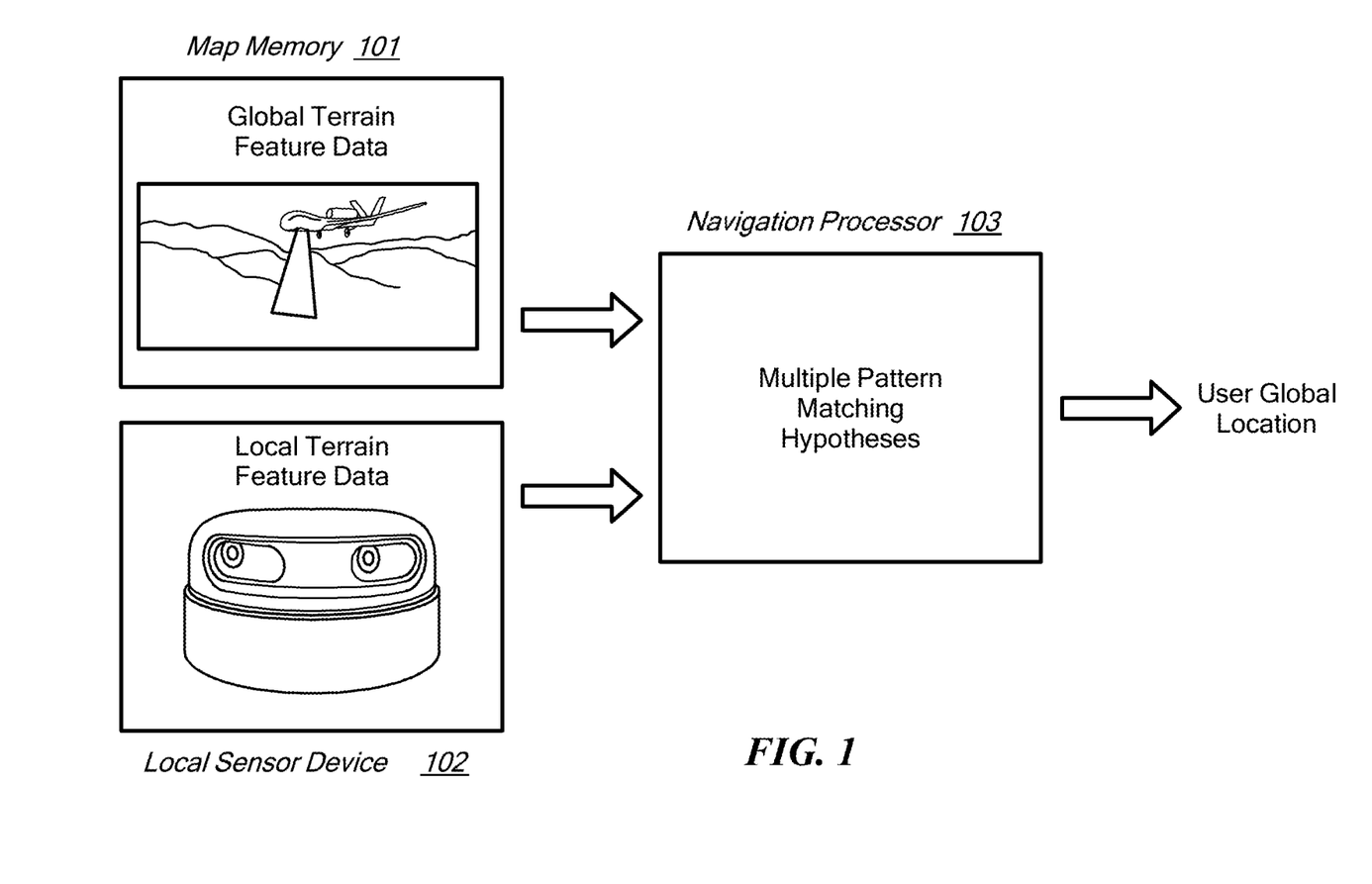
FIG. 1 shows a functional block diagram of a broad embodiment of the present invention.
Figure 2:
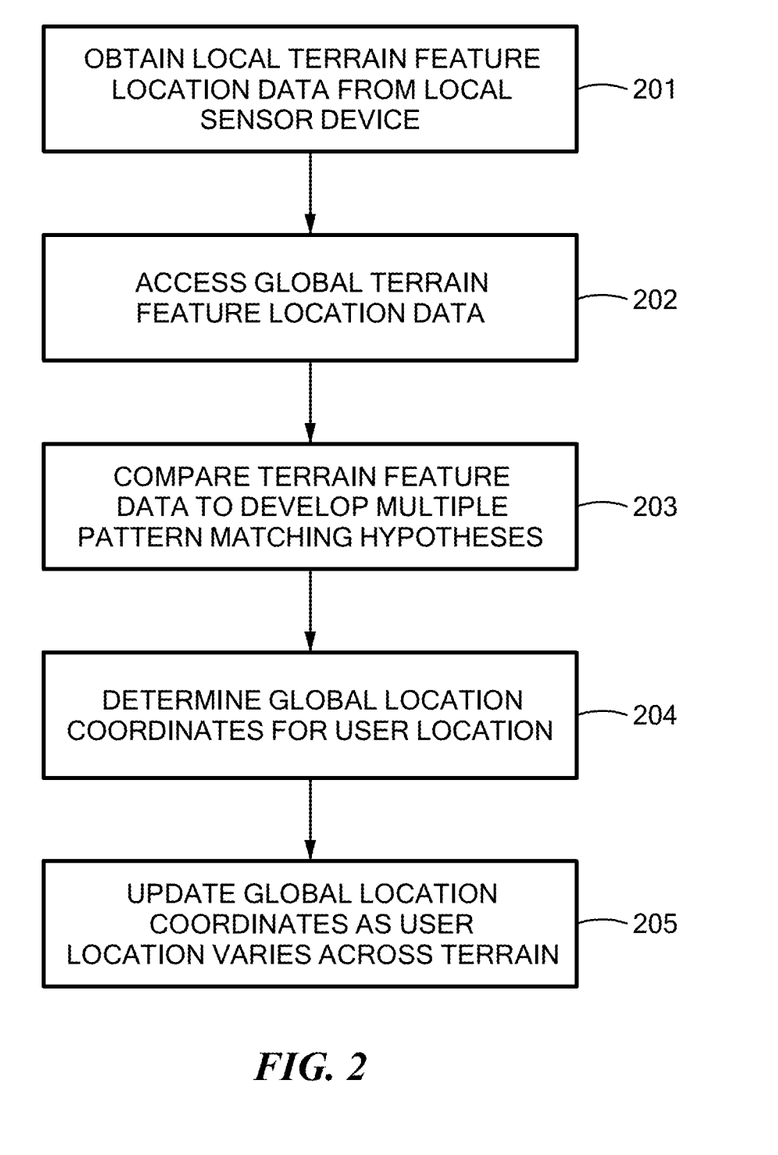
FIG. 2 shows various steps in determining a user global location according to an embodiment of the present invention.

More specifically, embodiments of the present invention are directed to a computer-implemented method employing at least one hardware implemented navigation processor and a related computer program product for terrain feature matching navigation that can accurately determine a user's global location by measuring the distances and angles to local terrain features such as trees within a local area of a user. FIG. 1 shows a functional block diagram and FIG. 2 shows various steps in determining a user global location according to a broad embodiment. The navigation processor 103 operates to execute program instructions to obtain local terrain feature location data from a local sensor device 102 at a user location without a prior-known global position, step 201. The local terrain feature location data characterizes relative distances and directions to multiple local terrain features that are located nearest to the user location.

Figure 3:
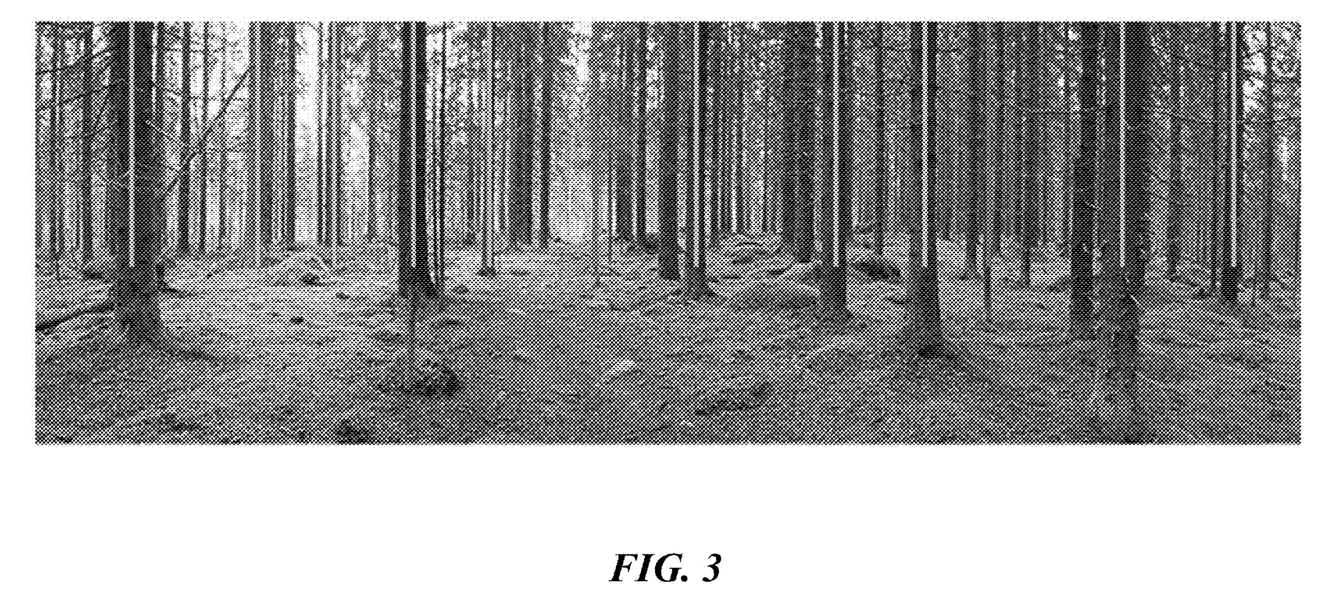
FIG. 3 shows an example of obtaining local terrain feature location data from a local sensor device according to an embodiment of the present invention.

FIG. 3 shows an example of obtaining local terrain feature location data from a local sensor device according to an embodiment of the present invention. In the example shown in FIG. 3, the two-dimensional location of the center of the tree's trunk is defined based on a local reference frame with the observer at the origin. Filtering algorithms can be used to ensure the best probability that the local observations are also mapped globally—the markers might be colored with a first color that indicates trees that would be labeled as "detections" based on their ability to penetrate the forest canopy and therefore be identified by overhead imagery, while markers of a second color could represent false alarms that would potentially not be found in the same overhead imagery.

The navigation processor 103 also accesses at least one hardware memory device 101, step 202, that contains global terrain feature location data (i.e., map data) that characterizes relative distances and directions between multiple distinctive terrain features located in a defined terrain region in terms of absolute global location coordinates. These distinctive terrain features and their characteristic data represent combinations of trees in the defined terrain region whose locations are known. Each tree is assumed to have a point location.

The navigation processor 103 then compares the local terrain feature location data to the global terrain feature location data to develop multiple pattern matching hypotheses, step 203, wherein each pattern matching hypothesis characterizes a likelihood of a subset of the local terrain features matching a subset of the global terrain features. Global location coordinates for the user location then are determined by the navigation processor 103, step 204, from the pattern matching hypotheses. As the user location varies across the terrain, the navigation processor 103 updates the global location coordinates, step 205.

Figure 4:
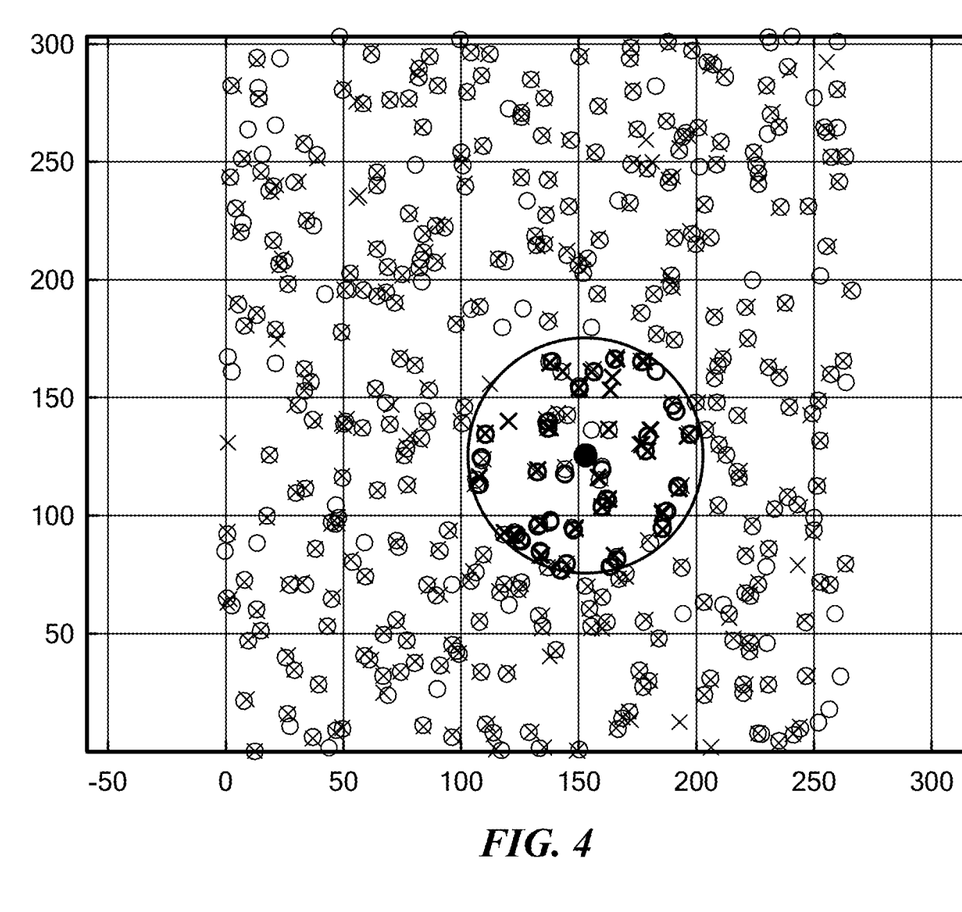
FIG. 4 shows an example of an overhead image of a portion of a forest illustrating the pattern of crown delineation.

FIG. 4 illustrates the principle of these ideas in the form of a known two-dimensional map of global positions of trees in a region of forest, where the user position is the solid dot at the center of a circle of local tree observations that are used for pattern recognition against the known map of the forest. Embodiments can be thought of as involving three distinct conceptual parts: (1) collection of data prior to use of the program, (2) physical components used by personnel or vehicles on or near the ground to determine the location and orientation of trees near them, and (3) a multiple hypothesis positioning algorithm that ties together pattern matching and tracking techniques to accurately determine the global position of the observer.

Data collection and map building. To perform the pattern matching functionality, the navigation processor needs access to an accurate map of pre-determined terrain feature locations. This may also include tree classifications and related tree classification information. Such information and arrangements are used in other fields such as forest registries and environmental science, and the data may be collected using overhead imagery such as satellite or aerial imagery and tree crown delineation to identify and globally locate trees in a desired area.

Figure 5:
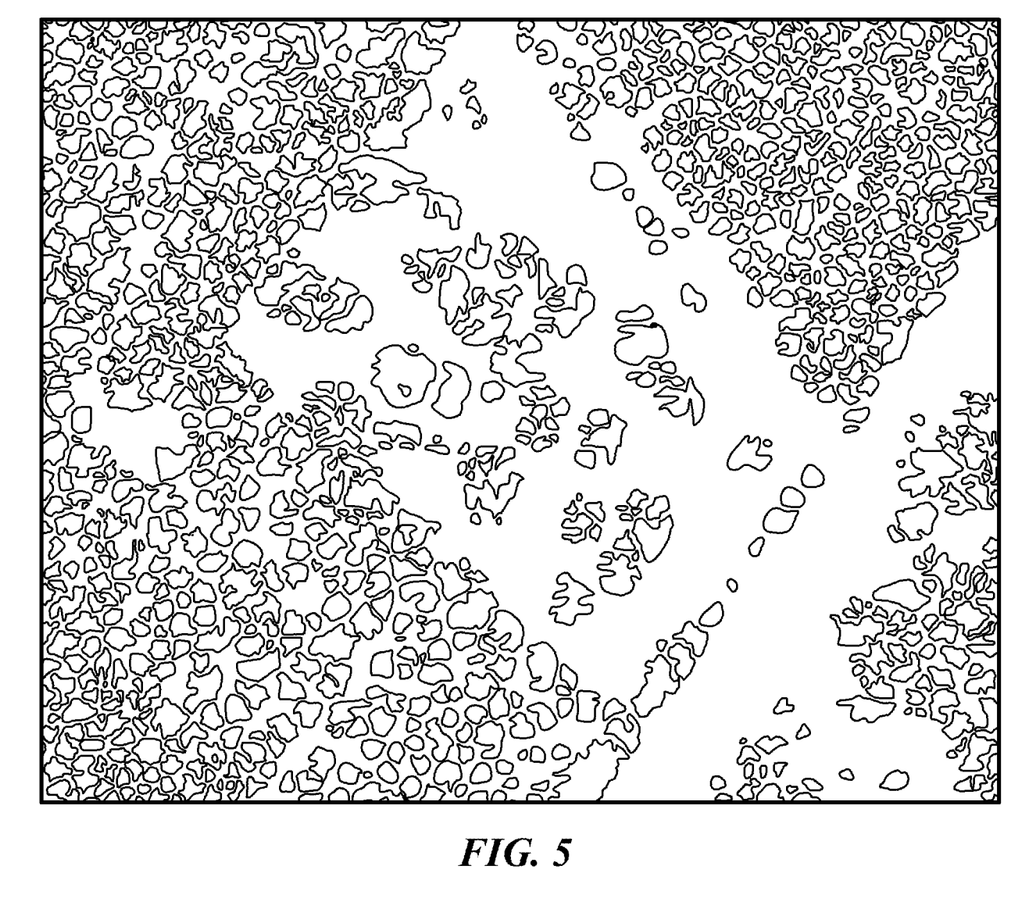
FIG. 5 shows the process flow in one specific embodiment of a multiple hypothesis k-closest matching algorithm.

FIG. 5 shows an example of an overhead image of a portion of a forest illustrating the pattern of crown delineation. Publicly accessible high-resolution (0.6 m resolution) satellite imagery previously has been used to show tree crown detection and identification for cataloging forests. Similar methods can be extended to detect and locate trees across defined terrain regions. In specific embodiments this may include classifying the trees by specific features such as color, shape, etc. For example, shape may be used to classify an object as a tree, building or statue. Length of shadow may be used to estimate height of the terrain feature, which may assist in the classification. Shape of the shadow also may be used to infer a profile shape of the terrain feature, which may assist in the classification. This all may be represented as a two-dimensional location of the tree in a North-East reference frame and a tree ID number, so that millions of trees could be stored on a single compact flash drive memory. Previous studies have shown accuracies of tree crown detection of up to 75% with satellite imagery and 85% with aerial imagery. Embodiments of the invention can incorporate these errors and still accurately determine the user's position. See Skurikhin, et al., "Unsupervised individual tree crown detection in high-resolution satellite imagery," Journal of Applied Remote Sensing, Vol. 10, Iss.1, p. 010501, Jan. 26, 2016, the entire contents of which are hereby incorporated by reference herein, for all purposes.

User Equipment Requirements.

Various existing equipment technologies can be used taking into account that the better the accuracy of the equipment in both identifying trees and locating the trees with respect to the observer, the more efficiently a given embodiment will be able to locate the observer against the global terrain feature location data. In some embodiments, a personal or UAV equipped LiDar unit, such as Scanse Sweep which boasts a 40 m range and relatively low cost of $350, may be used. Other potential sources of producing the local map are laser-range finding technology (<$200) or even camera imagery so long as range and orientation can be determined. The cost requirements for the necessary equipment can be application dependent so long as the equipment has the ability to identify trees or other terrain features in an observer's area and to locate the features in a two-dimensional space relative to the observer's frame of reference.

Multiple Hypothesis k-Closest Matching Algorithm.

The pattern matching functionality uses multiple hypothesis data association techniques to provide a robust determination of the observer's global position even in the presence of inaccurate or incomplete global and local mapping data. This can be done using a variation of a k-nearest vector search algorithm such as is used for star identification in star trackers. See Daniel Mortari, et al., "The Pyramid Star Identification Technique," Journal of the Astronautical Sciences, April, 1997, the entire contents of which are hereby incorporated by reference herein.

One challenge that is not a factor in star identification applications is the mapping uncertainty that is present in the global terrain feature location data. In star identification, star maps are well-known and well-defined so that there is little uncertainty in both the probability of false alarm as well as the assumed location of the stars. However, in forest settings, knowledge of the global terrain feature location data can be greatly affected by the method of mapping as well as the time between mapping the trees and the use of the information to determine the user location. Because of this greater uncertainty, multiple hypothesis data association techniques are needed to robustly handle and factor out the uncertainty when determining the user location.

Figure 6:
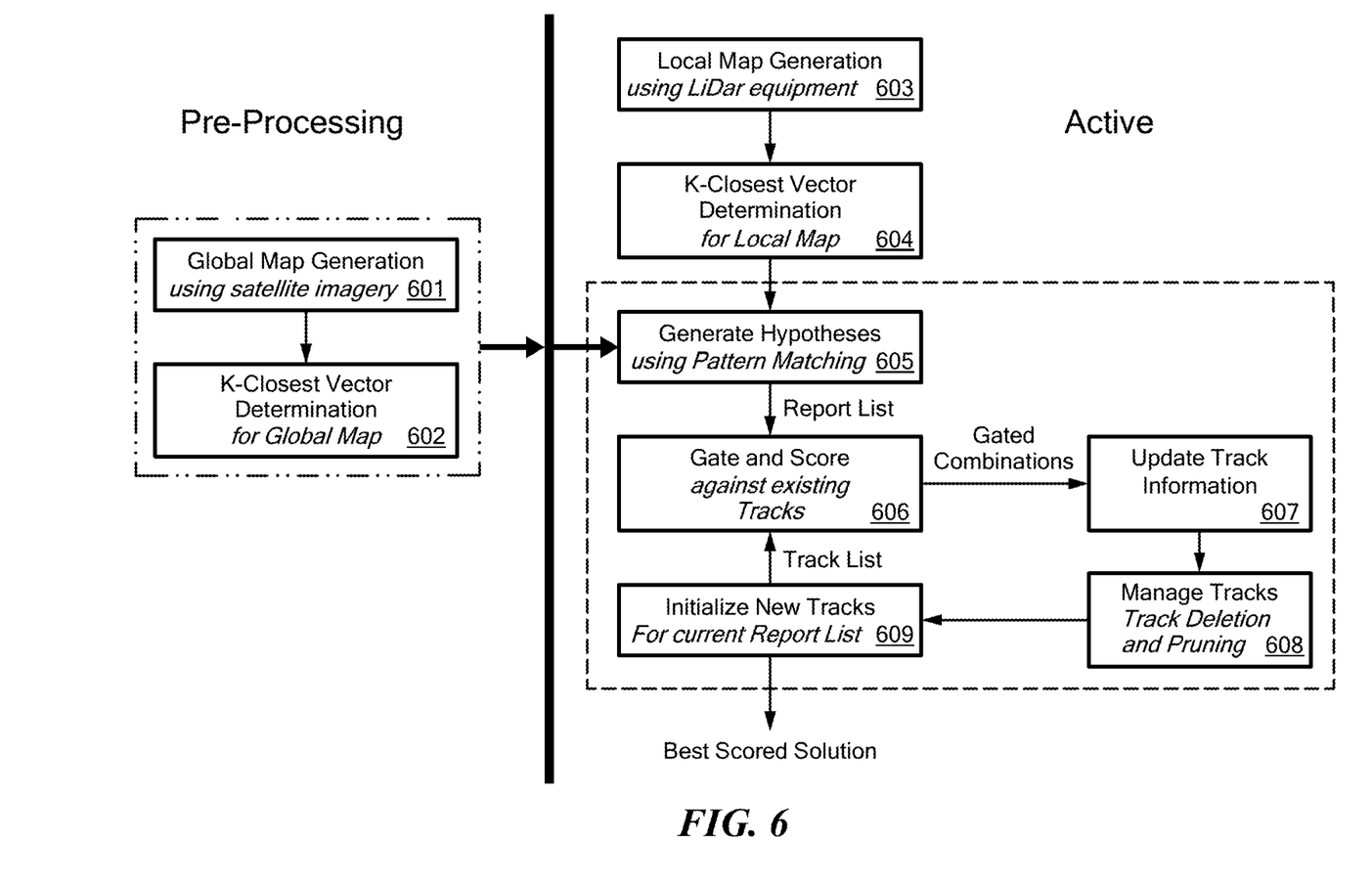
FIG. 6 shows the general process flow in one specific embodiment of a multiple hypothesis k-closest matching navigation approach.

FIG. 6 shows the general process flow in one specific embodiment of a multiple hypothesis k-closest matching approach in which each global tree in the global terrain feature location data and each local tree in the local terrain feature location data is associated with the other trees around it and the local tree associations are then matched to the global tree associations to determine the user location relative to the global map. For star trackers, this pattern matching approach allows for the orientation of satellites or other vehicles in GPS-denied frameworks, but this same idea can be applied to work in a Lost-in-Forest scenario by treating each tree as a point location with known uncertainty in a two-dimensional terrain map.

Figure 7A:
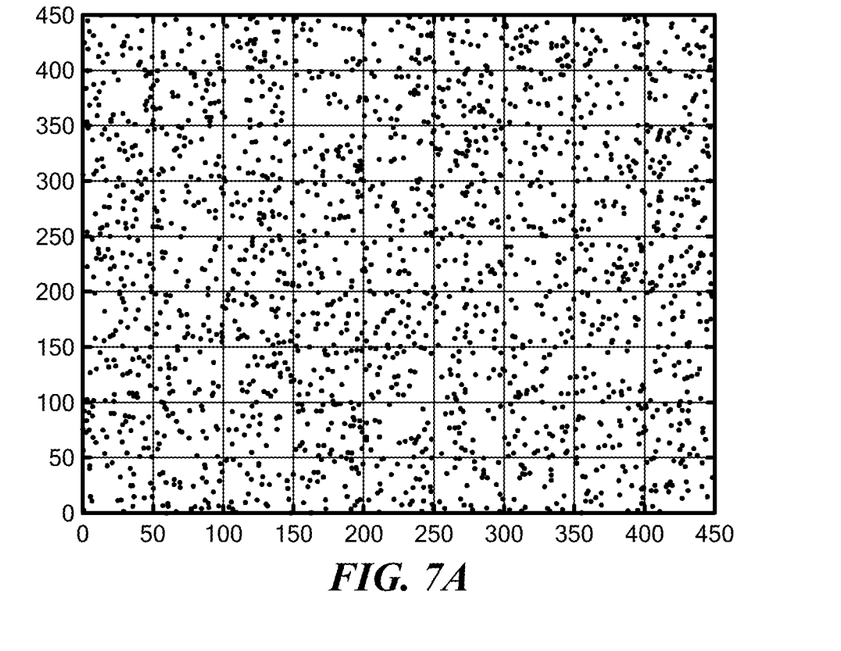
FIG. 7A shows a two-dimensional map of a section of forest where each individual tree location is represented as a dot.
Figure 7B:
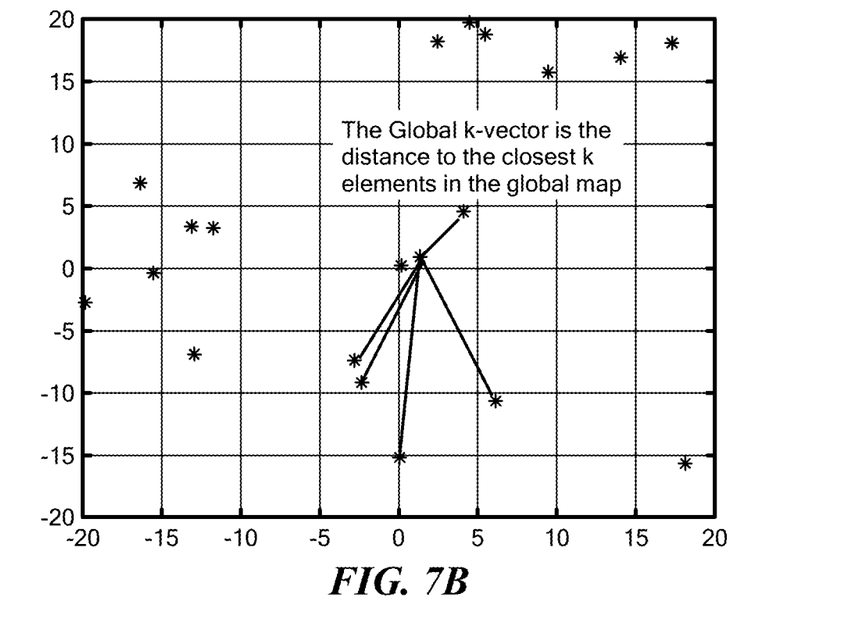
FIG. 7B shows that for each tree object in FIG. 7A, the distance to the k-closest elements is computed to form a k-vector that describes the object location.

The algorithm needs the information about each tree in both the local and global map to include the range to the k-closest other trees in both the local and the global area maps. The global area maps are generated as pre-process steps on the left side of FIG. 6 including generating a global tree location map, 601, and developing both the k-Vector best fit function and the feature vectors for all globally identified trees, 602. All the information about the global map and tree features can be stored in a global tree information database and made accessible to the observer when the application is needed. For example, FIG. 7A shows a two-dimensional map of a section of forest where each individual tree location is represented as a dot. For each tree object, the distance to closest k elements is computed to form a k—that describes the object location as shown in FIG. 7B. This means that only k+2 values are needed describe each tree object in the global map (x-y coordinates and the k-feature vector).

Figure 8A:
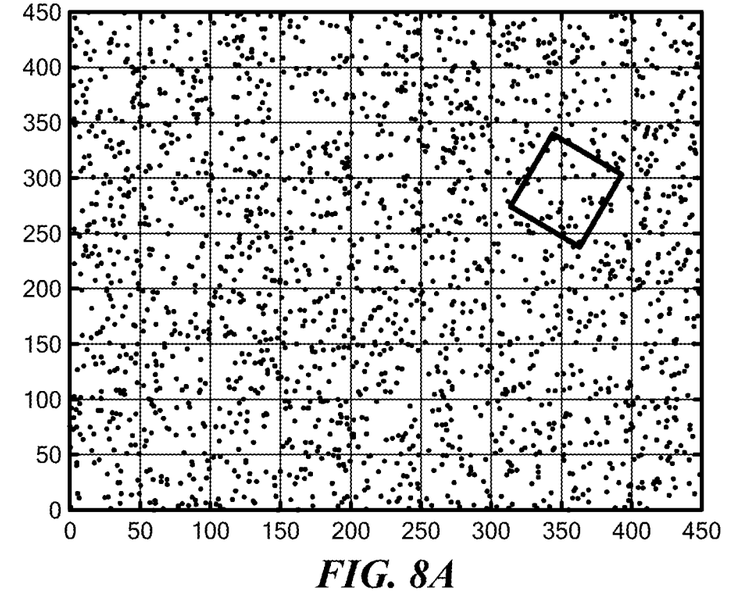
FIG. 8A shows highlighting a local area in a two-dimensional map of a section of forest as in FIG. 7A.
Figure 8B:
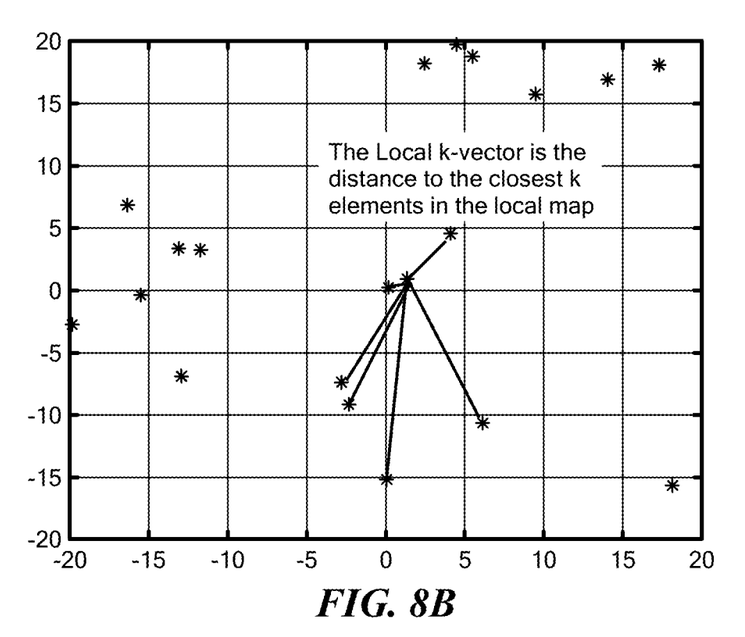
FIG. 8B shows that for each tree object in the local area in FIG. 8A, the distance to the k-closest elements is computed to form a k-vector that describes the object location.

The active portion of the multiple hypothesis k-closest matching algorithm is shown on the right side of FIG. 6 and starts with the observer surveying their area (e.g., with LiDar equipment) to determine a local area map characterizing the locations of the surrounding trees, 603. Then, a local k-closest feature vector is developed for all identified trees, 604. FIGS. 8A-8B illustrate this idea showing how the local observations can be developed as k-feature vector in the local map.

Figure 9A:
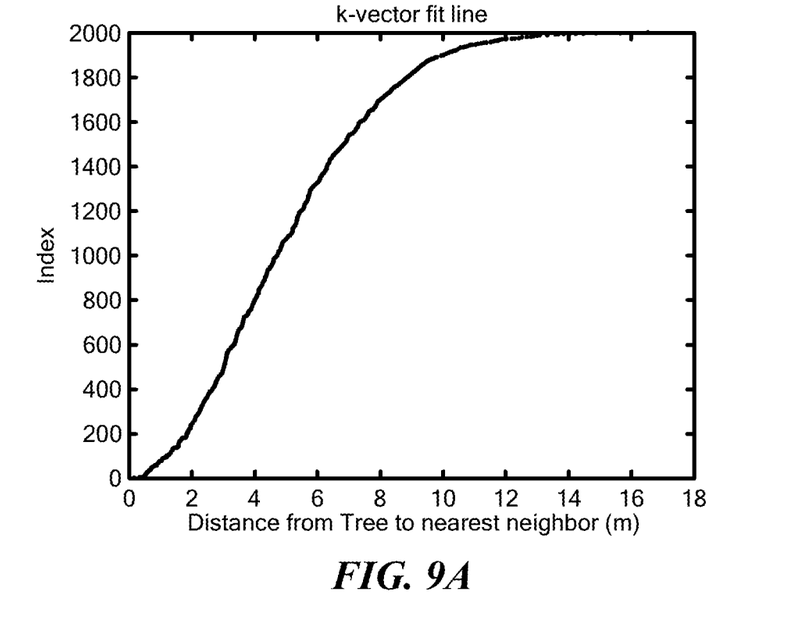
FIG. 9A shows using a fit line for the first element of the feature vector for the k-vector search algorithm.
Figure 9B:
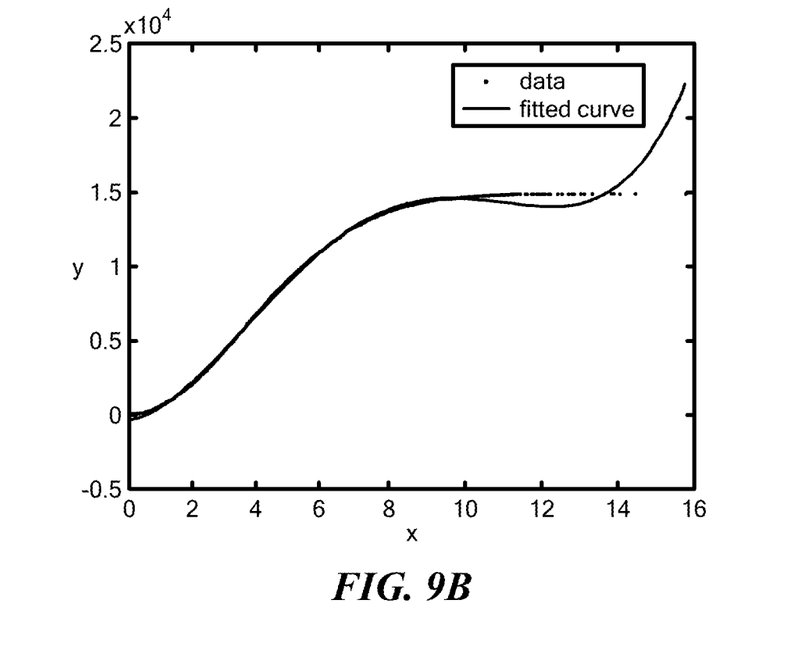
FIG. 9B shows that a small portion of the feature vectors can be compared.

Next the pattern matching blocks including generating potential local-to-global tree hypotheses to determine hypothesized position of the observer, 605, for example, by taking the difference between locally observed position of a potential tree match and the position of the globally identified tree. FIG. 9A shows how this can be based on using a fit line for the first element of the feature vector for the k-vector search algorithm. Then as shown in FIG. 9B, a small portion of the feature vectors can be compared when determining a pass list using the k-Vector search algorithm; for example, using a fifth order best fit for the Gaussian CDF relationship between distance between trees and their index.

Due to high uncertainties, it will be useful to maintain multiple hypotheses of location as the false alarm density in this problem can be significant. Since the required functions to relate the global and local reference frames of the potential tree match are linear, the total uncertainty of the hypothesized position is the sum of the global map uncertainty and the observation uncertainty:

$$p_{Report} = p_{TreeGlobal} - p_{TreeLocal}$$

$$P_{yyReport} = \sigma^2_{Global} + \sigma^2_{Local}$$

The linearity of the reference frame transformation eliminates the need for an unscented transform (as might be required in star tracking applications) and therefore further reduces computation requirements.

With both the position estimate and the covariance matrix of all hypotheses determined, the remaining modules 606, 607, 608 and 609 can then iterate through each new locally observed tree and build confidence in the observer's true position as more tree matches gate with each other in the observer's reference frame. Once a proposed observer position is passed onto the multiple hypothesis positioning framework, the algorithm then compares the proposed observer position to all other proposed positions from other previous local-global tree matches. The comparison is done by way of a likelihood ratio test which is defined by the likelihood that a group of proposed tree matches provide the actual position of the observer over the likelihood that the group of proposed tree matches represent a false hypothesis of the observer's location. Following the MHP framework with each new locally observed tree that is passed through the algorithm, the most likely hypothesis is output and checked against a score threshold. If the score threshold is met then the observer can make use of the position estimate.

Figure 10A:
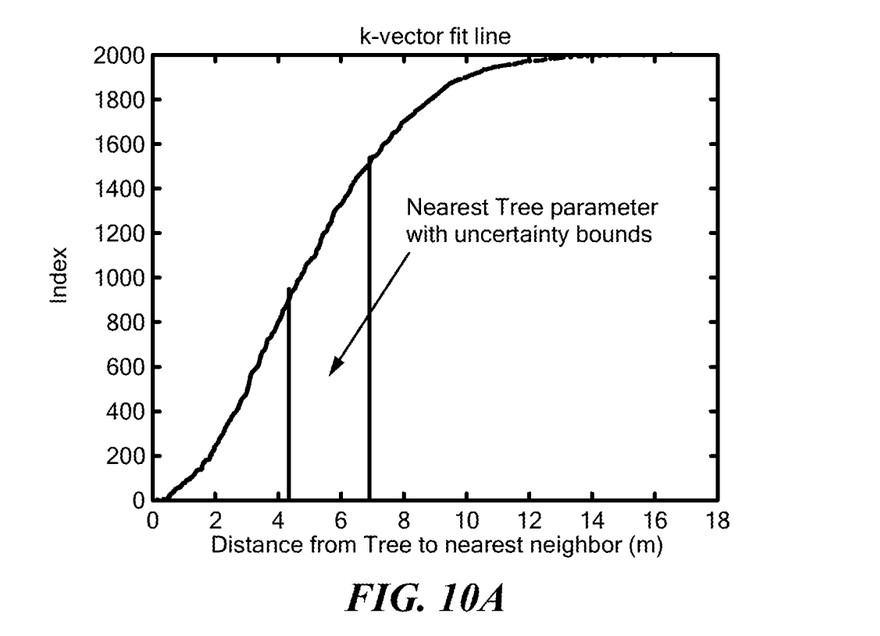
FIG. 10A shows using the predetermined fit line to refine the search.
Figure 10B:
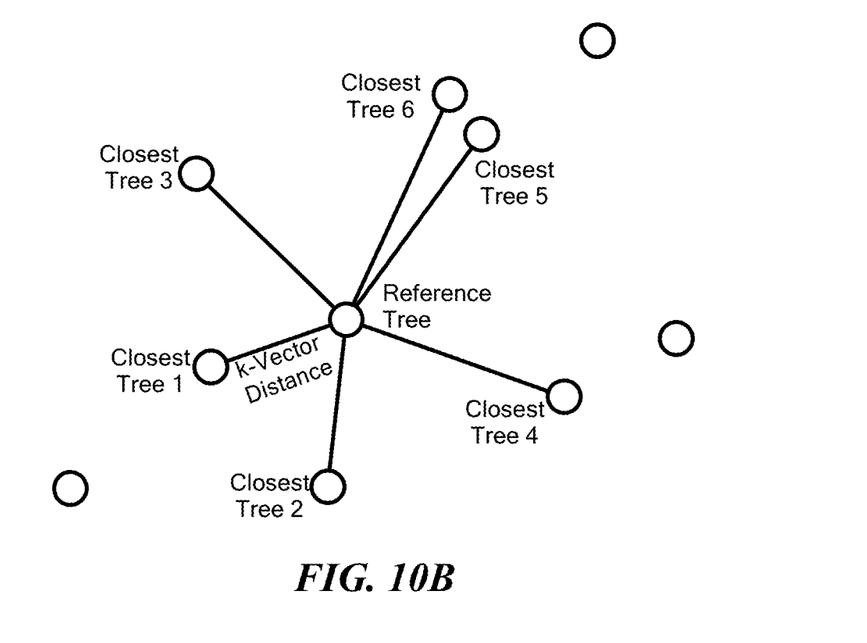
FIG. 10B shows that the rest of the feature vector can be used to further reduce the number of possible local-to-global tree matches.
Figure 11:
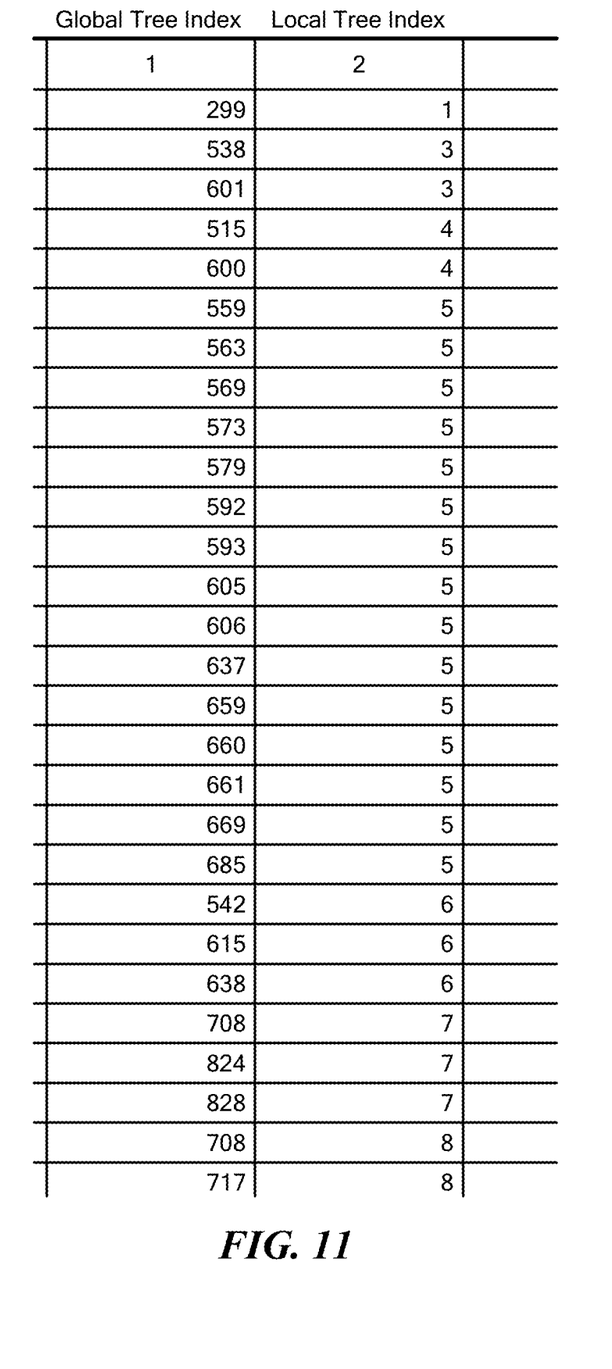
FIG. 11 shows a pass list consisting of all pairings that pass the threshold.

The algorithm searches through all the possible combinations of the local group to the global group. FIG. 10A shows using the predetermined fit line to refine the search similar to how it is used in the k-Vector Range Search Algorithm. To incorporate measurement uncertainty a range of potential tree IDs are extracted. Then as shown in FIG. 10B, the rest of the feature vector is used to further reduce the number of possible local-to-global tree matches. Matches may be considered only if enough (typically k−2) of the feature vector components pass an assigned threshold. FIG. 11 shows a pass list consists of all pairings that pass the threshold. All that is included in the pass list is the index of the global and local tree assignments. The pass list can then be used in the Multiple Hypothesis Positioning Framework to determine the correct observer position.

Other ways to make the algorithm more efficient and versatile include considering other features to pattern match between global and local tree maps, such as angle measurements to the closest trees (also common in star identification algorithms), size of tree trunks and/or canopies, tree type identification such as evergreen or deciduous trees and other distinguishable features. This is not an exhaustive list and essentially any features that can be easily determined in both aerial imagery and ground observation can be used for this algorithm to make it more robust and efficient.

In addition, the algorithm may be expanded from simply positioning to multiple hypothesis navigation with additional sensor fusion requirements, specifically the inclusion of IMU data to the algorithm. This development would also require the addition of velocity information of the user as an input into the algorithm. In order for the program to run efficiently in a navigation mode, as new trees are detected by the algorithm, a hash table of all the global trees may be used to only consider the most likely global tree matches for each current hypothesis.

In some embodiments, the trees are unclassified. That is, a tree is simply a static object whose location is known a priori, i.e., an object that is unlikely to move or be moved between a time when the object's location is ascertained for construction of the database and a time when the object is measured by the system to estimate the user's location. From this viewpoint, several types of objects may be considered trees. For example, literal trees, flagpoles, utility poles and obelisk statues may all be considered "trees."

In other embodiments, the trees may be classified. For example, literal trees may be classified as deciduous or evergreen. In another example, literal trees, flagpoles, utility poles, obelisk statues and buildings may each be so classified. In a classified embodiment, each tree's classification is stored in the database. When a measurement is taken in the environment to ascertain a user's location, the system automatically ascertains the classification of each observed tree, or the user enters this information. Having the classification of each observed tree increases accuracy and/or speed of the system, because observed trees are matched only with correspondingly classified trees in the database.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for determining global location coordinates, comprising:

using a local sensor device selected from the group consisting of: a LiDar sensor, a laser range finder, and a camera, at a user location without a prior-known global position, to obtain local terrain feature location data characterizing relative distances and directions to a plurality of local terrain features nearest to the user location;

storing in a hardware memory device global terrain feature location data, wherein the global terrain feature location data characterizes relative distances and directions between a plurality of distinctive terrain features located in a defined terrain region in terms of absolute global location coordinates, wherein the defined terrain region encompasses at least ninety thousand square meters (90,000 $m^2$); and executing, with a navigation processor, program instructions to:

receive, from the local sensor device local terrain feature location data and from the hardware memory device, global terrain feature location data;

compare the local terrain feature location data to the global terrain feature location data based on a k-closest vector search algorithm; wherein the k-closest vector search algorithm includes developing a k-closest feature vector for each of a plurality of local terrain features and a k-closest feature vector for each of a plurality of global terrain features;

develop a plurality of pattern matching hypotheses using the k-closest feature vector for each of a plurality of local terrain features and the k-closest feature vector for each of a plurality of global terrain features, wherein each pattern matching hypothesis characterizes a likelihood of the plurality of local terrain features matching a subset of the plurality of global terrain features, wherein the likelihood is reiterated for each new locally observed terrain feature to form a reference frame having a group of locally observed terrain features; and determine the global location coordinates for the user location from the plurality of pattern matching hypotheses wherein determining the global location coordinates for the user location from the plurality of pattern matching hypotheses accommodates possible additions and deletions of terrain features in the local terrain feature location data compared to the subset of the global terrain features.

2. The method according to claim 1, further comprising:

updating the global location coordinates for the user location as the user location varies over time with user movement.

3. The method according to claim 2, wherein the local sensor further includes an inertial measurement unit (IMU) device, wherein the local terrain feature location data includes IMU data.

4. The method according to claim 1, wherein the comparing includes considering mapping uncertainty factors in terms of a defined pattern matching confidence threshold.

5. The method according to claim 1, wherein the global terrain feature location data is derived from overhead imaging data.

6. The method according to claim 1, wherein the global terrain feature location data is derived from Lidar data and/or radar data.

7. The method according to claim 1, wherein the distinctive terrain features comprise trees.

8. A system for determining global location coordinates comprising:
   a local sensor device selected from the group consisting of: a LiDar sensor, a laser range finder, and a camera, at a user location without a prior-known global position, configured to obtain local terrain feature location data characterizing relative distances and directions to a plurality of local terrain features nearest to the user location;
   a hardware memory device storing global terrain feature location data, wherein the global terrain feature location data characterizes relative distances and directions between a plurality of distinctive terrain features located in a defined terrain region in terms of absolute global location coordinates, wherein the defined terrain region encompasses at least ninety thousand square meters (90,000 m$^2$);
   a navigation processor configured to execute program instructions to:
   receive, from the local sensor device local terrain feature location data and from the hardware memory device global terrain feature location data;
   compare the local terrain feature location data to the global terrain feature location data based on a k-closest vector search algorithm; wherein the k-closest vector search algorithm includes developing a k-closest feature vector for each of a plurality of local terrain features and a k-closest feature vector for each of a plurality of global terrain features;
   develop a plurality of pattern matching hypotheses using the k-closest feature vector for each of a plurality of local terrain features and the k-closest feature vector for each of a plurality of global terrain features, wherein each pattern matching hypothesis characterizes a likelihood of the plurality of local terrain features matching a subset of the plurality of global terrain features, wherein the likelihood is reiterated for each new locally observed terrain feature to form a reference frame having a group of locally observed terrain features; and
   determine global location coordinates for the user location from the plurality of pattern matching hypotheses wherein determining the global location coordinates for the user location from the plurality of pattern matching hypotheses accommodates possible additions and deletions of terrain features in the local terrain feature location data compared to the subset of the global terrain features.

9. The system according to claim 8, wherein navigation processor is further configured to:
   update the global location coordinates for the user location as the user location varies over time with user movement.

10. The system according to claim 9, wherein the local sensor further includes an inertial measurement unit (IMU) device, wherein the local terrain feature location data includes IMU data.

11. The system according to claim 8, wherein the comparing includes considering mapping uncertainty factors in terms of a defined pattern matching confidence threshold.

12. The system according to claim 8, wherein the global terrain feature location data is derived from overhead imaging data.

13. The system according to claim 8, wherein the global terrain feature location data is derived from LiDar data and/or radar data.

14. The system according to claim 8, wherein the distinctive terrain features comprise trees.

15. A method for determining global location coordinates, comprising:
   using a local sensor device selected configured to obtain local terrain feature location data characterizing relative distances and directions to a plurality of local terrain features nearest to a user location;
   storing in a hardware memory device global terrain feature location data, wherein the global terrain feature location data characterizes relative distances and directions between a plurality of distinctive terrain features located in a defined terrain region in terms of absolute global location coordinates; and
   executing, with a navigation processor, program instructions to:
      receive, from the local sensor device local terrain feature location data and from the hardware memory device, global terrain feature location data;
      compare the local terrain feature location data to the global terrain feature location data;
      develop a plurality of pattern matching hypotheses, wherein each pattern matching hypothesis characterizes a likelihood of the plurality of local terrain features matching a subset of the global terrain features, wherein the likelihood is reiterated for each new locally observed terrain feature to form a reference frame having a group of locally observed terrain features; and
      determine the global location coordinates for the user location from the plurality of pattern matching hypotheses wherein determining the global location coordinates for the user location from the plurality of pattern matching hypotheses accommodates possible additions and deletions of terrain features in the local terrain feature location data compared to the subset of the global terrain features.

* * * * *